United States Patent
Larsson et al.

(10) Patent No.: US 6,217,084 B1
(45) Date of Patent: Apr. 17, 2001

(54) DEVICE ON A CONDUIT END AND ARRANGEMENT FOR JOINING CONDUITS

(75) Inventors: Bengt I. Larsson, Skivarp; Viveca Svensson, Trelleborg, both of (SE)

(73) Assignee: Dresser Wayne Aktiebolag, Malmo (SE)

( * ) Notice: Subject to any disclaimer, the term of this patent is extended or adjusted under 35 U.S.C. 154(b) by 0 days.

(21) Appl. No.: 09/315,272

(22) Filed: May 20, 1999

Related U.S. Application Data

(63) Continuation of application No. PCT/SE97/01823, filed on Oct. 30, 1997.

(30) Foreign Application Priority Data

Nov. 21, 1996 (SE) .................................................. 9604278

(51) Int. Cl.$^7$ .................................................. F16L 37/08
(52) U.S. Cl. ........................ 285/305; 285/368; 285/374; 285/404
(58) Field of Search .................. 285/305, 368, 285/233, 374, 404

(56) References Cited

U.S. PATENT DOCUMENTS

| | | |
|---|---|---|
| 245,263 | 8/1881 | Robb . |
| 552,319 * | 12/1895 | Farrey .................................. 285/404 |
| 3,223,438 * | 12/1965 | DeCenzo .............................. 285/233 |
| 3,282,612 * | 11/1966 | Younger ............................... 285/305 |
| 3,402,945 * | 9/1968 | Rittenhouse ......................... 285/368 |
| 3,523,701 | 8/1970 | Graham ................................ 285/150 |
| 3,584,902 | 6/1971 | Vyse ..................................... 285/305 |
| 3,596,934 * | 8/1971 | DeCenzo .............................. 285/233 |
| 3,753,582 | 8/1973 | Graham ................................ 285/305 |
| 3,913,954 | 10/1975 | Klimpl .................................. 285/305 |
| 3,929,356 * | 12/1975 | DeVincent et al. .................. 285/305 |
| 3,929,357 | 12/1975 | DeVincent et al. . |
| 4,035,005 | 7/1977 | DeVincent et al. .................. 285/319 |
| 4,055,359 | 10/1977 | McWethy . |
| 4,431,218 | 2/1984 | Paul, Jr. et al. ...................... 285/305 |
| 4,524,995 | 6/1985 | Bartholomew ......................... 285/54 |
| 4,526,411 | 7/1985 | Bartholomew ....................... 285/305 |
| 4,570,980 | 2/1986 | Goward ................................ 285/305 |
| 4,768,587 | 9/1988 | Halder .................................. 165/177 |
| 5,046,765 * | 9/1991 | Usui ..................................... 285/305 |
| 5,211,427 | 5/1993 | Washizu ................................. 285/23 |
| 5,462,313 | 10/1995 | Rea et al. ............................... 285/21 |
| 5,542,716 | 8/1996 | Szabo et al. ......................... 285/305 |
| 5,593,187 | 1/1997 | Okuda et al. ........................ 285/305 |
| 5,607,192 | 3/1997 | Lee ....................................... 285/305 |
| 5,718,463 | 2/1998 | Hollnagel ............................. 285/319 |
| 5,904,221 * | 5/1999 | Breitweg et al. .................... 285/305 |

FOREIGN PATENT DOCUMENTS

| | | |
|---|---|---|
| 1918772 | 10/1970 | (DE) . |
| 3642149 * | 7/1987 | (DE) ..................................... 285/305 |
| 3531926 | 7/1988 | (DE) . |
| 4333273 | 11/1994 | (DE) . |
| 0 287 791 | 10/1988 | (EP) . |
| 0 444 857 | 9/1991 | (EP) . |
| 1 494 669 | 12/1977 | (GB) . |
| 176889 * | 7/1989 | (JP) ..................................... 285/305 |
| 369 767 | 9/1974 | (SE) . |
| 386967 | 8/1976 | (SE) . |
| 8000082 | 8/1981 | (SE) . |

\* cited by examiner

*Primary Examiner*—Dave W. Arola
(74) *Attorney, Agent, or Firm*—Haynes and Boone LLP

(57) ABSTRACT

A device on a conduit end for joining the conduit (1) to a coupling (4) or some other receiver of the end of the conduit, which is made of aluminium or an aluminium alloy. Two external annular beads (2, 2') are pressed out from the conduit wall on the conduit end and accommodate between themselves an O ring (3). In an arrangement for joining, the receiver (4) has a conical inlet and means, which together with the rear annular bead (2) form engaging means for a tightening means.

2 Claims, 4 Drawing Sheets

DEVICE ON A CONDUIT END AND ARRANGEMENT FOR JOINING CONDUITS

This application is a continuation of international application number PCT SE97/01823, filed Oct. 30, 1997.

The present invention relates to a device on a conduit end and an arrangement for joining conduits.

Many methods are known for joining components for fluid pipes, e.g. conduits. One method aims at welding or soldering collars in/to the conduit ends, between which collars a flat packing is clamped by means of bolts which are screwed through flanges attached to the conduits. The bolts must be forcefully tightened so as to achieve a satisfactory seal. In another method, conical sockets instead of collars are welded/soldered to the conduit ends which are joined by means of corresponding conical couplings, the conduits and the coupling being also in this case interconnected by means of bolts that are screwed through flanges. Sealing is effected by means of O rings arranged in grooves in the sockets. Obviously the methods require a relatively large number of components and relatively great efforts and are cost-intensive also for the reason that a relatively expensive material, such as copper, brass or steel, must be used. A less expensive piping is obtained with aluminium, use being made of conduits with protruding ends and coupling components which are die-cast and formed with threads but which must be machined owing to the fact that small tolerances are required for obtaining a satisfactory seal with the flat packing when the fluid has operating pressure. The machining operation involves a risk that the die-cast material obtains pores, thereby causing leakage in the coupling component.

An object of the invention is to provide a device which permits joining of conduits in an inexpensive and efficient manner and which does not result in a reduction of the inner cross-section of the conduits which are joined together.

The object is achieved by a device and an arrangement according to the claims.

DESCRIPTION OF THE PREFERRED EMBODIMENTS

Figure 1:
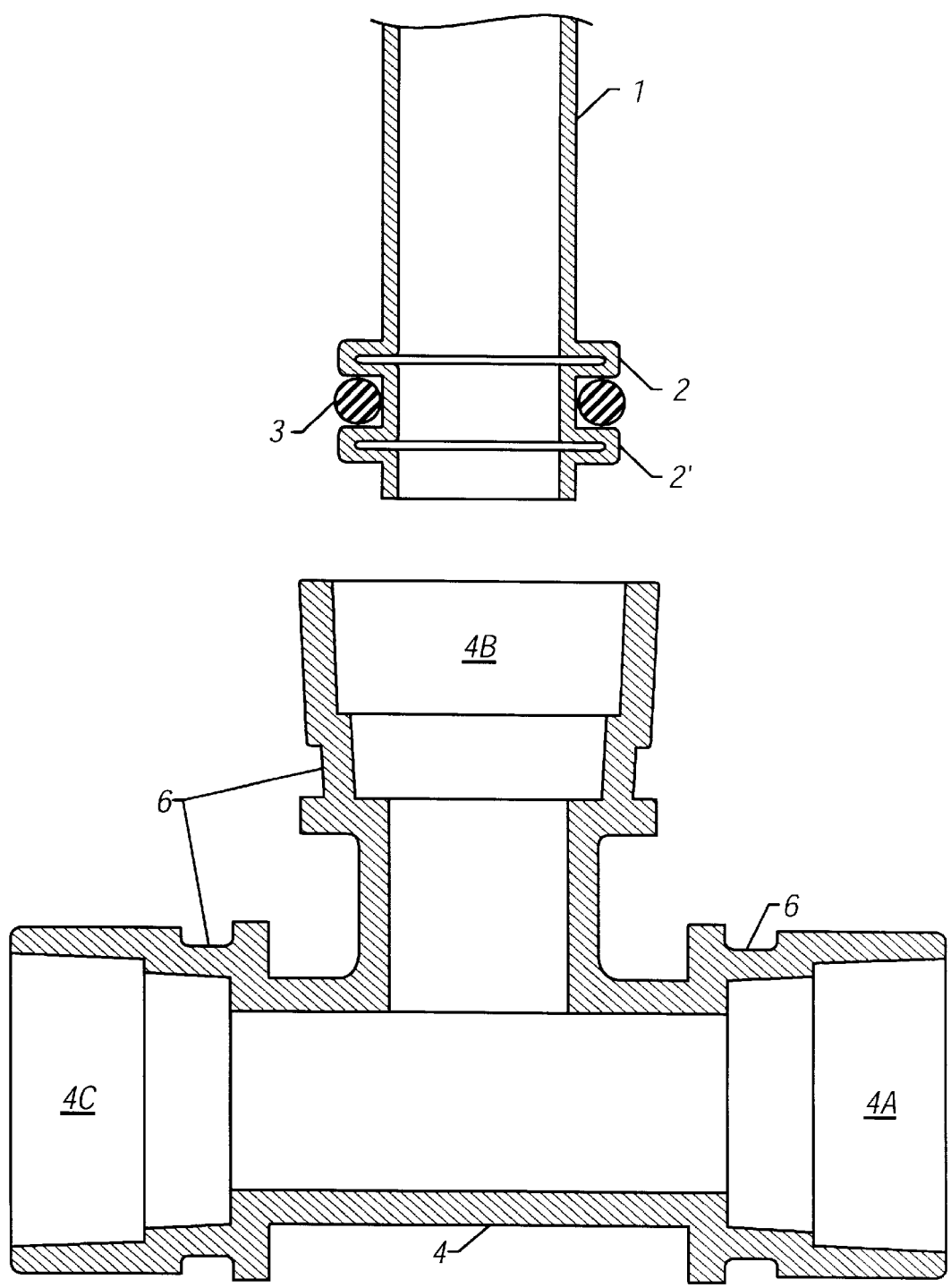
FIG. 1 is longitudinal section of a longitudinal part of a conduit and a longitudinal section of a T-shaped pipe coupling.
Figure 2A:
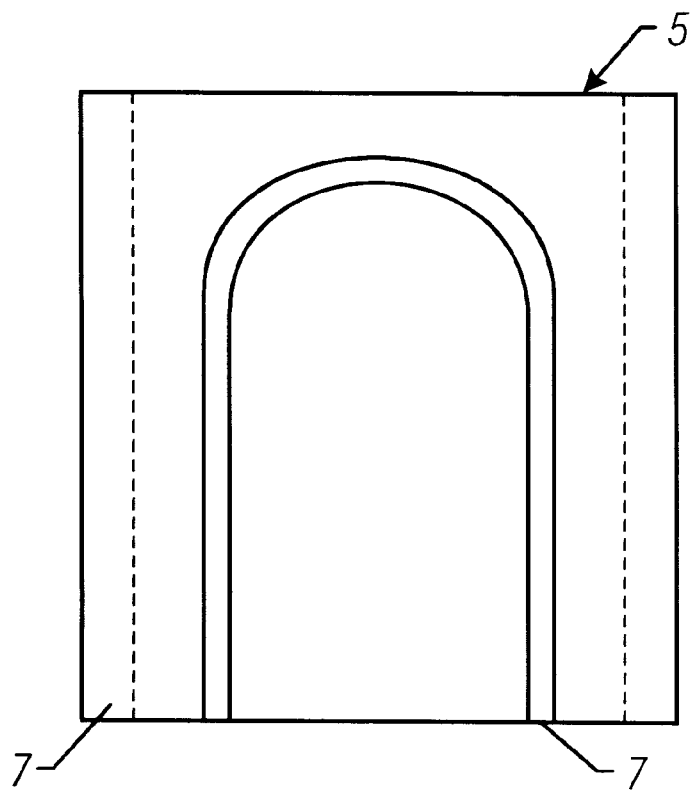
FIGS. 2a and 2b are a side view and a top plan view of a joining rider.
Figure 2B:
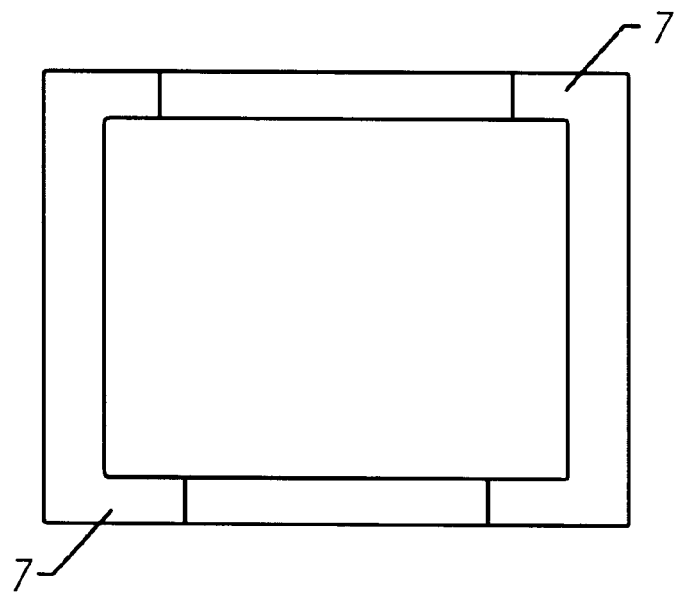

According to the invention, the conduit 1 made of aluminium or an aluminium alloy is provided with two external annular beads 2, 2' at its joining end, said beads being formed of the actual conduit wall in a bulging lathe. The space between the beads is adapted to receive an O ring seal 3, which is pulled over the outer bead 2'. The coupling 4 is, for instance, die-cast of aluminium and its inlets/outlets 4A–4C are somewhat conical. Since the O ring is locked by the beads 2, 2', the coupling need not be machined to obtain a close tolerance for receiving the conduit, and a radial seal is obtained between the conduit and the coupling without necessitating a great tightening force on the O ring. For easily releasable tightening after joining, use can be made of a rider 5, the legs 7 of which engage behind the inner bead 2 and in a groove 6 formed in the outside of the coupling. The front bead 2' may consist of a widened end portion of the conduit 1.

Figure 3:
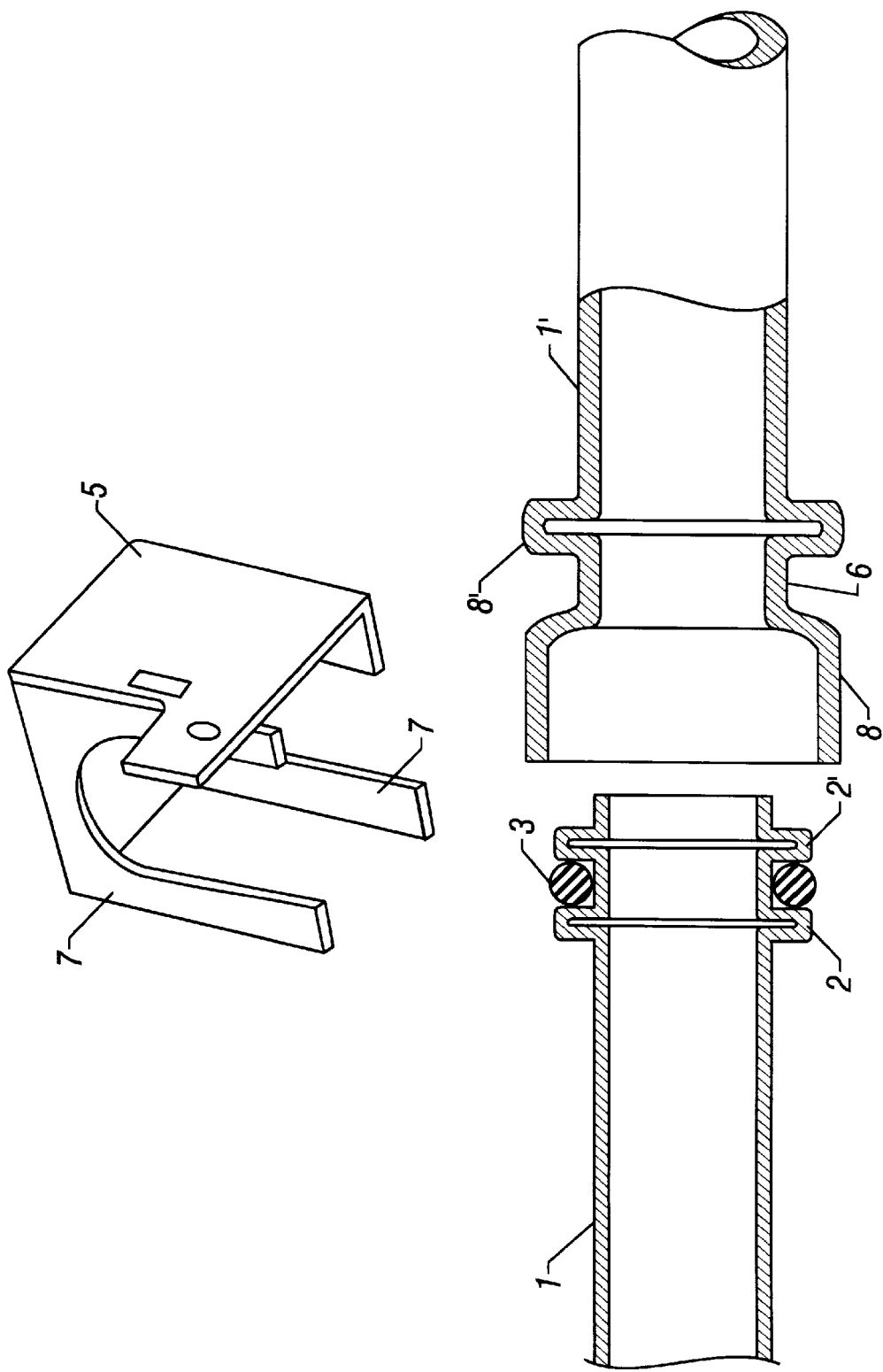
FIG. 3 is a view illustrating the principle of the invention applied to two conduits, which are shown in longitudinal section, while the joining rider is shown in a perspective view.
Figure 4:
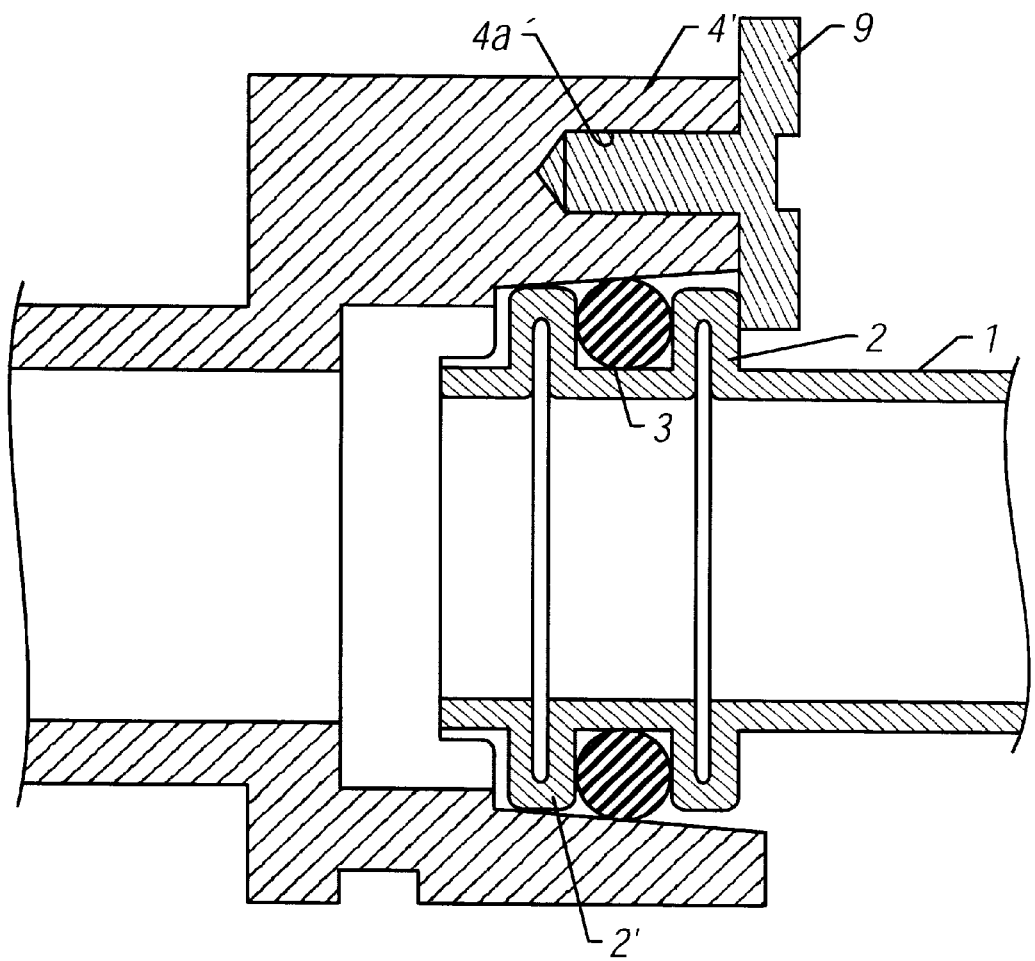
FIG. 4 is a view showing the conduit held in the coupling by a self-threading screw.

It will be appreciated that no coupling 4 is required for connecting two conduits. According to FIG. 3, the second conduit 1' can, by pressure turning, be provided with a widened end portion 8 for receiving the end of the conduit 1, which is provided with the beads 2, 2' and the O ring 3, and with, for instance, a posteriorly situated bead 8' for forming the groove 6 for a rider leg 7 as described above. Furthermore, as shown in FIG. 4, any suitable means other than a rider as above can be used for tightening, e.g. a self-threading screw 9, which is screwed into a bore 4a formed in e.g. the wall of the coupling 4', as shown in FIG. 4, the screw being substantially parallel with the connecting direction, the underside of the screw head or a washer being supported against the rear bead 2.

What is claimed is:

1. A fluid distribution system comprising:

an annular receiver having an axial bore;

a conduit having an end for disposing in the receiver bore, the end having first and second external annular beads formed in a spaced relationship thereupon;

a sealing member for engaging the receiver bore to form a seal, the member disposed between and engaging the first and second annular beads; and a screw retained in the receiver and engaging the first external annular bead for detachably retaining the conduit end in the receiver.

2. A fluid distribution system comprising:

an annular coupling having an axial bore;

a conduit having an end for disposing in the coupling bore, the end having first and second external annular beads formed in a spaced relationship thereupon;

a sealing member for engaging the coupling bore to form a seal, the member disposed between and engaging the first and second annular beads; and a screw retained in the coupling and engaging the first external annular bead for detachably retaining the conduit end in the coupling.

* * * * *

UNITED STATES PATENT AND TRADEMARK OFFICE
CERTIFICATE OF CORRECTION

PATENT NO.     : 6,217,084 B1
DATED          : April 17, 2001
INVENTOR(S)    : Larsson et al.

It is certified that error appears in the above-identified patent and that said Letters Patent is hereby corrected as shown below:

<u>Title page,</u>
Item [57], should read:

-- ABSTRACT
A fluid distribution system is described herein, the system comprising an annular receiver, such as a coupling, having an axial bore. A conduit having an end for disposing in the receiver bore is provided, the end having first and second external annular beads formed in a spaced relationship thereupon. A sealing member for engaging the receiver bore to form a seal is provided, the member disposed between and engaging the first and second annular beads. A screw is retained in the receiver and engages the first external annular bead for detachably retaining the conduit end in the receiver. --

Signed and Sealed this

Second Day of July, 2002

Attest:

JAMES E. ROGAN
*Attesting Officer*     *Director of the United States Patent and Trademark Office*